(12) United States Patent
Sorensen et al.

(10) Patent No.: US 9,981,200 B2
(45) Date of Patent: May 29, 2018

(54) EXTERNAL MIXING PRESSURIZED TWO-FLUID NOZZLE AND A SPRAY DRYING METHOD

(75) Inventors: Per Bo Sorensen, Frederiksberg (DK); Anders Bo Jensen, Niva (DK); Soren Fredsted, Stenlose (DK)

(73) Assignee: GEA Process Engineering A/S, Soborg (DK)

( * ) Notice: Subject to any disclaimer, the term of this patent is extended or adjusted under 35 U.S.C. 154(b) by 915 days.

(21) Appl. No.: 13/981,800

(22) PCT Filed: Feb. 28, 2011

(86) PCT No.: PCT/DK2011/050060
§ 371 (c)(1),
(2), (4) Date: Oct. 1, 2013

(87) PCT Pub. No.: WO2012/116697
PCT Pub. Date: Sep. 7, 2012

(65) Prior Publication Data
US 2014/0014276 A1 Jan. 16, 2014

(51) Int. Cl.
*B01D 1/18* (2006.01)
*B01J 2/02* (2006.01)
(Continued)

(52) U.S. Cl.
CPC .................. *B01D 1/18* (2013.01); *B01J 2/02* (2013.01); *B01J 2/04* (2013.01); *B05B 7/06* (2013.01);
(Continued)

(58) Field of Classification Search
CPC .. B05B 7/06; B05B 7/066; B05B 7/10; B05B 7/062; B01D 1/18; B01J 2/04; B01J 2/02; B22F 9/08; B22F 9/082; F26B 3/12
See application file for complete search history.

(56) References Cited

U.S. PATENT DOCUMENTS

| 2,592,297 A | 4/1952 | LaGuilharre |
| 3,401,883 A | 9/1968 | Gebhardt et al. |

(Continued)

FOREIGN PATENT DOCUMENTS

| CN | 1046290 A | 10/1990 |
| EP | 0400659 A1 | 12/1990 |

(Continued)

OTHER PUBLICATIONS

Hede, P., et al., "Two-fluid spray atomisation and pneumatic nozzles for fluid bed coating/agglomeration purposes: A review", Chemical Engineering Science 63: 3821-3842 (2008).*

(Continued)

*Primary Examiner* — Katherine Zalasky
*Assistant Examiner* — Benjamin Lebron
(74) *Attorney, Agent, or Firm* — Sughrue Mion, PLLC

(57) ABSTRACT

Disclosed herein is an external mixing pressurized two-fluid nozzle for atomising a liquid by means of liquid pressure and gas, comprising an inner feed liquid pipe (1) extending axially between an upstream end and a downstream end, having a feed liquid conduit (2), a feed liquid inlet (3) positioned at the upstream end and a feed orifice (4) positioned at the downstream end, and a co-axial first gas pipe (5) extending radially outside the inner feed liquid pipe (1) and forming a first gas conduit (6) between the first gas pipe (5) and the inner feed liquid pipe (1), the first gas pipe (5) having a gas outlet slit (7) positioned at the downstream end. Said external mixing two-fluid nozzle provides a swirling motion of the gas, which combined with a pressurized feed liquid enables the production of spray dried powder at industrially applicable capacities with low energy consumption and a small particle size.

17 Claims, 2 Drawing Sheets

(51) Int. Cl.
  *B05B 7/06* (2006.01)
  *B01J 2/04* (2006.01)
  *F26B 3/12* (2006.01)
  *B05B 7/10* (2006.01)
  *B22F 9/08* (2006.01)

(52) U.S. Cl.
  CPC .............. *B05B 7/062* (2013.01); *B05B 7/066* (2013.01); *B05B 7/10* (2013.01); *F26B 3/12* (2013.01); *B22F 9/08* (2013.01); *B22F 9/082* (2013.01)

(56) References Cited

U.S. PATENT DOCUMENTS

| | | | | |
|---|---|---|---|---|
| 4,988,464 | A * | 1/1991 | Riley | B01J 2/04 264/12 |
| 6,565,010 | B2 * | 5/2003 | Anderson | B05B 7/066 239/13 |
| 7,694,944 | B2 | 4/2010 | Gottlieb et al. | |
| 2004/0124270 | A1 * | 7/2004 | Zhou | B01J 2/04 239/399 |
| 2005/0051917 | A1 | 3/2005 | Grothe et al. | |
| 2008/0254132 | A1 * | 10/2008 | Truong-Le | A61K 9/1694 424/499 |

FOREIGN PATENT DOCUMENTS

| | | |
|---|---|---|
| EP | 0408801 B1 | 11/1995 |
| EP | 1 707 257 A2 | 10/2006 |
| FR | 1510504 A | 1/1968 |
| WO | 00/58014 A1 | 10/2000 |
| WO | 2009/067488 A1 | 5/2009 |

OTHER PUBLICATIONS

NIST, "Isobaric Data for Nitrogen at P = 69.7 psia", http://webbook.nist.gov/cgi/fluid.cgi?P=69.7&TLow=373&THigh=2000&TInc=100&Applet=on&Digits=5&ID=C7727379&Action=Load&Type=IsoBar&TUnit=K&PUnit=psia&DUnit=Ibm%2Fft3&HUnit=kJ%2Fmol&WUnit=m%2Fs&VisUnit=uPa*s&STUnit=N%2Fm&RefState=DEF.*

NIST, "Isobaric Data for Nitrogen at P = 114.7 psia", http://webbook.nist.gov/cgi/fluid.cgi?P=114.7&TLow=373&THigh=2000&TInc=100&Applet=on&Digits=5&ID=C7727379&Action=Load&Type=IsoBar&TUnit=K&PUnit=psia&DUnit=Ibm%2Fft3&HUnit=kJ%2Fmol&WUnit=m%2Fs&VisUnit=uPa*s&STUnit=N%2Fm&RefState=DEF.*

Assael, M., et al., Reference data for the density and viscosity of liquid copper and liquid tin, Journal of Physical and Chemical Reference Data, 39: 033105 (2010).*

Keith Masters, "The Process Stages of Spray Drying," Atomization; 1991 Edition; ISBN 0-470-21743-X (pp. 250-253).

Arthur H. Lefebvre, "Atomization and Sprays," Combustion: An International Series; ISBN 0-89116-603-3 (1989) Relevant pp. 20-22, 105-107, 136-140, 146-149, and 230-238.

International Search Report for PCT/DK2011/050060, dated Jun. 4, 2012.

* cited by examiner

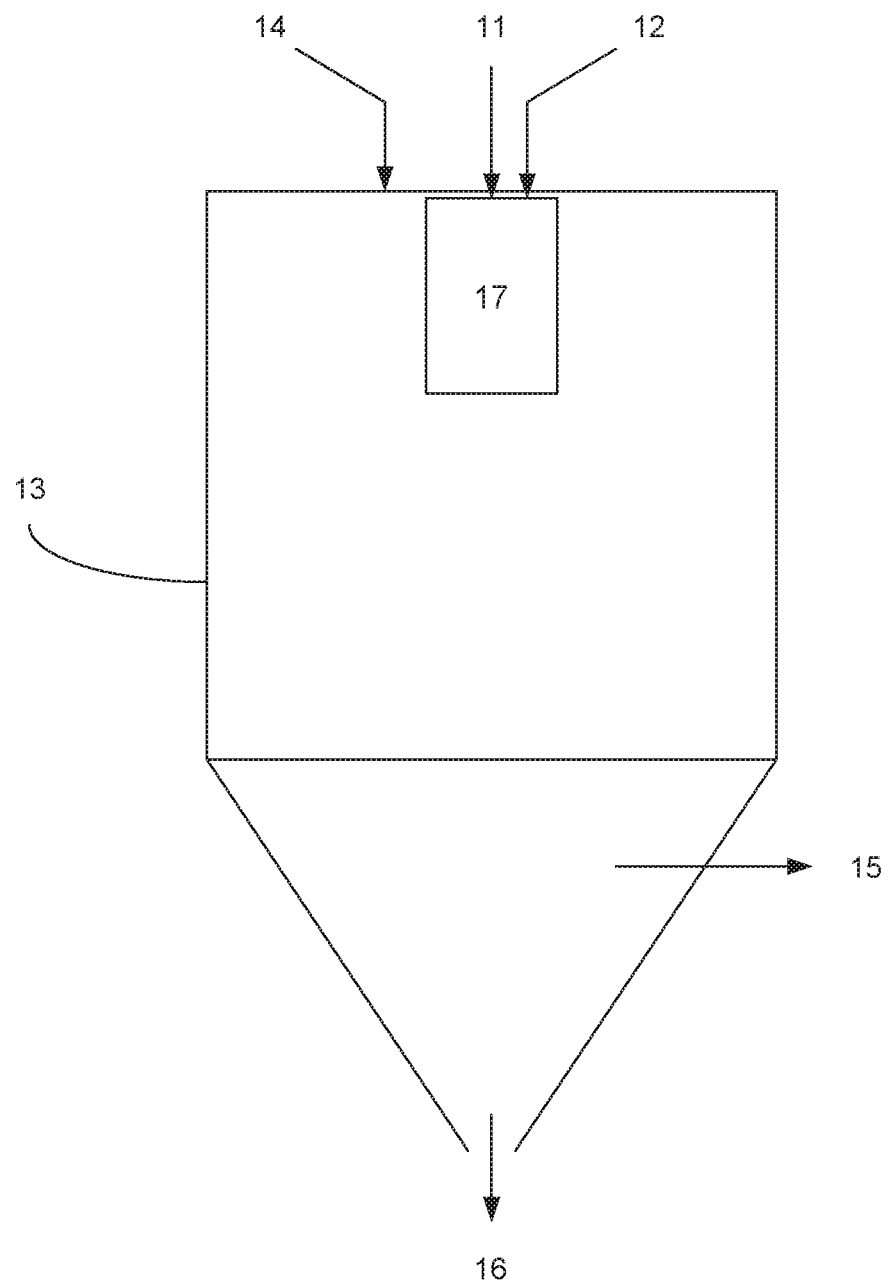

EXTERNAL MIXING PRESSURIZED TWO-FLUID NOZZLE AND A SPRAY DRYING METHOD

FIELD OF THE INVENTION

The present invention relates to an external mixing pressurized two-fluid nozzle for atomising a liquid by means of a liquid pressure and a gas, comprising an inner feed liquid pipe extending axially between an upstream end and a downstream end, having a feed liquid conduit, a feed liquid inlet positioned at the upstream end and a feed orifice positioned at the downstream end, and a co-axial first gas pipe extending radially outside the inner feed liquid pipe and forming a first gas conduit between the first gas pipe and the inner feed liquid pipe, the first gas pipe having a gas outlet slit positioned at the downstream end. The invention furthermore relates to a spray processing method for producing a spray dried powder by use of an external mixing pressurized two-fluid nozzle for producing droplets of a liquid by means of a liquid pressure and a gas. In addition, the invention relates to the use of said external mixing two-fluid nozzle for producing a spray dried powder.

BACKGROUND OF THE INVENTION

Spray drying is a drying process, which involves both particle formation and drying. It involves atomisation of a feed, typically a liquid concentrate, into a spray and contact between the spray and a drying medium. The formation of the spray (atomisation) and the contacting of the spray with the drying medium may be achieved by use of a nozzle.

Pneumatic nozzle atomisation involves impacting a liquid feed with a high velocity gas. The high velocity gas creates high frictional forces and disintegrates the liquid feed into spray droplets. The feed liquid is believed to break-up in two stages. The first phase involves the tearing of the liquid feed into filaments and large droplets. The second phase completes the atomisation by breaking these liquid forms into smaller and smaller droplets. The entire process is influenced by the magnitude of the surface tension, density, pressure and viscosity of the liquid feed as well as the velocity and density of the gaseous flow.

Various design techniques are available to produce the required conditions of liquid-gas contact for atomisation. As disclosed in the book "Spray drying" by Keith Masters, 1991 edition, page 251, the designs may be divided into 4 categories:
(1) Internal mixing in which liquid feed and atomising gas are contacted within the nozzle head.
(2) External mixing, in which liquid feed and atomising gas are contacting outside the nozzle head.
(3) Combined internal and external mixing by using two atomising gas flows within the nozzle head (three-fluid nozzle).
(4) Pneumatic cup atomising, in which feed liquid and atomising gas is contacted at the rim of a rotating nozzle head.

The different design techniques provide different properties and result in different outcome of the final atomised product. In the first 2 categories the feed liquid and atomising gas are passed separately to the nozzle. Such nozzles, which are usually denoted two-fluid nozzles (TFN), are i.a. used for atomisation of a liquid in spray drying plants and in fluid bed agglomeration. The liquids can be in the form of solutions, dispersion or pure substances. In particular, two-fluid nozzles are used when atomising a fluid, where fine droplets is the objective or where additional atomisation energy in the form of atomising gas is required to break up a fluid into droplets. Nozzle designs of the third and fourth category are not the subject of the present application.

Internal mixing TFN has the advantage, compared to external mixing TFN, that it is mixing gas and liquid before the two fluids enter the surrounding atmosphere of the drying chamber. However, nozzles providing internal mixing are not as well suited for handling abrasive feeds as the internal mixing introduces additional wearing of the equipment. Conventional two-fluid nozzles with internal gas/liquid mixing also introduce the risk of drying out and thereby clogging the mixing chamber.

Internal mixing nozzles give the possibility of an efficient liquid-gas reaction, but are limited in capacity by internal channelling and channel dimensions. Internal parts in the nozzle, intended for improving the gas-liquid mixing, also disturb the flow, causing the span of the droplet size distribution to rise. Internal parts in general complicate handling, cleaning and causes wear. Furthermore viscous liquid feeds may be difficult to process.

Examples of nozzles of the internal mixing type are well known in the art. U.S. Pat. No. 7,694,944 (GEA Niro) discloses a nozzle in which the gas is supplied in the axial direction of the nozzle. The nozzle comprises a mixing chamber, one or more liquid inlets and at least one tangential gas inlet to the mixing chamber. In a commercially available internal mixing nozzle the atomising gas is supplied tangentially in a separate pipe, which contributes to the radial dimensions of the nozzle. Furthermore, the mixing chamber of this prior nozzle comprises edges and obstructions resulting from structural conditions. International published application WO 00/58014 discloses a sprayer in the form of a nozzle having a tangential gas inlet to the mixing chamber and lateral liquid inlets. This nozzle suffers from insufficient mixing due to the geometry of the nozzle.

Criterions for evaluating the performance of a two-fluid nozzle are: the mean droplet size, the span of the droplet size distribution and not least the specific gas consumption, meaning the amount of gas used to atomise a given amount of liquid, also called the gas-to-feed ratio. In addition to the criterions focused on the product quality, the production capacity of the two-fluid nozzle is also of high importance— especially from a commercial point of view. Furthermore, increasing focus on clean technologies as well as increasing energy prices put forward additional requirements with respect to energy consumption when operating and producing by spray processes.

The contact and mixing of gas and liquid is where external mixing TFN meet their restrictions. External mixing TFN, where the gas mixes with the liquid after leaving the nozzle typically through a ring-shaped aperture, meets the limitation when the gap in the gas exit becomes so large that a larger part of the gas is lost into the surrounding atmosphere of the drying chamber, instead of reacting with the liquid. With external mixing TFN, the free expansion of the gas has the disadvantage of being partly lost to the surrounding instead of adding energy to break up the liquid. In the prior art this problem has been attended.

Another type of nozzles utilizes pressurization of the liquid, meaning that the feed concentrate is fed under pressure to the nozzle. Pressure energy is converted to kinetic energy, and feed issued from the nozzle orifice as a high speed film that readily disintegrates into a spray as the film is unstable. Sprays from pressure nozzles handling high feed rates are generally less homogeneous and coarser.

EP 408 801 B1 suggests a low pressurized liquid, internal mixing two-fluid nozzle which can function satisfactory even when low pressure is applied during a period of start-up as small droplets are produced. The spray nozzle unit is provided with a gas slit between the pressure nozzle and the air nozzle to give a part of the discharging air stream a swirling motion.

The present invention is directed to a high pressurized liquid external mixing two-fluid nozzle that efficiently uses the atomizing gas. It is well known within the art that the disadvantages of pneumatic nozzles concern the high cost of compressed air and low nozzle efficiency. Furthermore, a drawback with several of the pre-existing, conventional two-fluid spray nozzle units is the limited capacity when very fine droplets are required. The object of the present invention is to provide for an external mixing pressurized two-fluid nozzle, which is energy efficient, provides high capacity while still producing fine droplets.

SUMMARY OF THE INVENTION

The present invention relates to an external mixing pressurized two-fluid nozzle for atomising a liquid by means of a liquid pressure and a gas, comprising an inner feed liquid pipe extending axially between an upstream end and a downstream end, having a feed liquid conduit, a feed liquid inlet positioned at the upstream end and a feed orifice positioned at the downstream end, and a co-axial first gas pipe extending radially outside the inner feed liquid pipe and forming a first gas conduit between the first gas pipe and the inner feed liquid pipe, the first gas pipe having a gas outlet slit positioned at the downstream end. The nozzle further comprises a co-axial second gas pipe extending radially outside the first gas pipe and forming a second gas conduit between the second gas pipe and the first gas pipe, the first gas conduit being closed at the upstream end and the second gas conduit being closed at the downstream end, wherein the first gas conduit and the second gas conduit are connected by one or more slot(s) being adapted for providing a swirling motion of a gas flow.

Spray drying procedures with the external mixing two-fluid nozzle according to the above-mentioned design has proven to provide a high production capacity while still retaining a mean particle size and a span wanted for. In prior art nozzles for external mixing the production of fine particles in spray drying applications limit the capacity as the increased liquid flow requires the gap in the gas exit to become larger or, alternatively the pressure to be increased. The effect is that a larger part of the gas is lost into the surrounding atmosphere, instead of reacting with the liquid. However, with the external mixing two-fluid nozzle according to the invention the gas flow pattern at the outlet slit is designed to require a reduced gas flow, thus ensuring increased reaction with the liquid when the feed liquid is supplied with a substantial pressure.

According to the present invention, the liquid is pre-atomized by an elevated liquid pressure to form a thin film, which is subsequently atomized into fine droplets by means of the pressurised gas. In prior art nozzles having a normal liquid pressure this pre-atomization does not form to the same extent. Typically, the formation of the droplets in prior art nozzles is mostly due to the high velocity of the gas, which at high capacities is subject to limitations as presented in the background section i.a. incomplete atomisation leading to larger particle sizes and broader distribution.

Surprisingly, the external mixing two-fluid nozzle of the present invention forms powders with a small span. The span expresses how wide the particle size distribution is. Aiming at a specific particle size, a narrow distribution is desired. A wide distribution of the droplet size is generally disadvantageous. The span, evaluated as (d90-d10)/d50 is normally found in the range from 1 to 2 for the nozzle of the invention.

Within the two gas conduits of the nozzle, the swirl motion is generated by directing the gas flow through one or more slots connecting the two gas conduits. The design and effectiveness of the atomisation mechanisms provided by the pressurized two-fluid nozzle according to the invention enables high-viscous liquid to be atomised at industrial applicable feed rates. In addition, the formation of a pre-atomisation of the liquid combined with the full swirl motion of the gas enables the atomisation of the liquid feed at low gas flow rates.

It is a further advantage of the nozzle according to the invention that the high shear atomization takes place outside the nozzle itself as the nozzle will be well suited for handling abrasive feed liquids, and the risk of drying out and thereby clogging of the nozzle is avoided due to the external contact between gas and liquid.

In a preferred aspect of the invention, the gas outlet slit and the feed orifice essentially are in the same horizontal position. The effect of this feature is that an external mixing is ensured, i.e. that the feed liquid and the atomization gas are mixed outside the sensitive components of the nozzle. The inner feed liquid pipe may be retracted or protruded relative to the tip of the first gas pipe to an inessential degree, such as +/−5 mm.

Usually, the inner feed liquid pipe, the first gas pipe and the second gas pipe are concentric and tubular. The concentric and tubular design provides for a uniform treatment of the atomization gas so that the flow pattern along the gas outlet slit is uniform. Furthermore, in preferred embodiments, the gas outlet slit is annular for a uniform gas dispersion to form, which provides for the formation of a cloud of droplets within a restricted volume of the drying chamber.

According to an aspect of the invention, the one or more slot(s) connecting the first gas conduit and the second gas conduit extend tangentially to the outer surface of the inner feed liquid pipe. This feature adapts the one or more slots for providing a swirling motion of the gas once it flows from the second gas conduit through the one or more slots and into the first gas conduit. In the event the nozzle holds more than one slot it is important that the slots extend tangentially to the inner feed liquid pipe in the same direction, meaning that all slots should provide for the gas to flow in the same clockwise or counter-clockwise direction around the inner feed liquid pipe, thereby enhancing the swirling motion of the gas.

The two-fluid nozzle according to the invention provides for the entire gas stream to flow through the one or more slots adapted for providing a swirling motion. The inventors found that compared to only providing for part of the gas to flow through means for providing a swirling motion as suggested in EP 408 801 the design of the present invention imparts an increased swirling motion. This in turn results in a lowered overall gas flow of the nozzle. However, due to the pre-atomising of the liquid by means of pressurising the liquid feed, the required amount of atomisation gas is at a lower level. The swirling motion of the gas, however, provides for an improved atomisation of the liquid by imparting the swirling/rotating motion to the liquid.

The one or more slots may be directed at an upwards or downwards angle relative to the horizontal plane, such as +/−5° or more. The individual slots may be placed at different horizontal levels along the first gas pipe.

By providing a converging portion at the downstream end of the nozzle it may improve both the mean droplet size distribution and the span of the droplet size distribution. The converging may be at an angle of 5° to 80° or more preferable of 10° to 45° relative to the vertical plane.

The two-fluid nozzle of the invention may be prepared in any suitable material. For highly abrasive feed liquids, however, it may be advantageous that at least the inner feed liquid pipe wear parts are of a wear resistant material, such as a ceramic material.

To adapt the nozzle of the invention to various process conditions and feed liquids, the inner feed liquid pipe and/or the first gas pipe may be exchangeable and/or adapted for receiving one or more inserts, and/or the second gas pipe outer wall is adapted for mounting in a lance. The design could be a nozzle lance with concentric pipes and a nozzle head as described herein mounted in the downstream end. Such nozzle head or parts hereof may be exchangeable to adapt to a relevant feed capacity.

The invention also relates to a spray processing method for producing a spray dried powder. The method includes the steps of: providing a spray drying apparatus comprising an external mixing two-fluid nozzle having inlets for feed liquid and atomization gas, a drying chamber having a drying gas inlet and exits for spent drying gas/atomising gas and produced powder, spraying in the drying chamber the feed liquid through the external mixing two-fluid nozzle by means of liquid pressure and the atomisation gas into droplets, drying the droplets to a powder, discharging the powder trough the exit for produced powder and the spent gas through the exit for spent gas, wherein the atomisation gas is supplied to the nozzle with a pressure in the range of 0.2 to 10 bar(g), the entire amount of atomisation gas in the nozzle is provided with a swirling motion, the feed liquid is supplied to the nozzle with a pressure at or above 8 bar(g), and the weight ratio of atomisation gas flow to feed liquid flow is in the range of 0.1 to 10.

The inventors surprisingly found that providing a pressurised liquid feed to a two-fluid nozzle providing the atomizing gas with a swirling motion, results in a reduction in the required gas pressure even for the production of powders with a mean particle size below 50 μm. In comparison to conventional two-fluid nozzles, the external mixing two-fluid nozzle according to the present invention has lower energy consumption. This is presently believed to be because energy input for atomization provided by elevated liquid pressure is utilized more efficiently compared to energy input provided by elevated air pressure. Conventional two-fluid nozzles apply pressurized gas for atomization, whereas the external mixing two-fluid nozzle according to the present invention applies a combination of pressurized liquid and pressurized gas. Furthermore, the use of conventional two-fluid nozzles with external mixing will have a limited capacity when very fine droplets are required, whereas the two-fluid nozzle according to the present invention will have an increased liquid capacity, in some embodiments up to e.g. 500 kg/h.

The swirling motion may be provided by a number of means, including inclining slats in the passageway of the atomising gas in the nozzle, meandering gas channels formed in the nozzle, etc. According to a preferred aspect of the invention the swirling motion is provided by one or more slots, which connects a second gas conduit and a first gas conduit, said second conduit being connected to a gas supply and formed between a first gas pipe and a second gas pipe extending radially outside the first gas pipe and said first gas conduit being formed between an inner feed liquid pipe and the first gas pipe, said second gas conduit being closed at the downstream end, said first gas conduit being closed at the upstream end and connected to a gas outlet slit in the downstream end. In a certain embodiment, the external mixing two-fluid nozzle used in the above method is a nozzle as disclosed in the attached claims.

The slots in the nozzle are designed to give the atomization gas the required swirl without imposing the gas flow to unnecessary friction. In a certain embodiment, the one or more slot(s) connecting the first gas conduit and the second gas conduit extend tangentially to the outer surface of the inner feed liquid pipe. Due to the fact that the entire amount of gas is guided through the one or more slots a complete swirling motion of the gas is obtained. The swirling motion of the gas provides for an improved atomisation of the liquid by imparting the swirling/rotating motion to the liquid.

The feed liquid is provided with a certain pressure before ejection into the drying chamber. The pressure is usually not less than 5 bar(g) if the benefits of the invention is to be obtained. In a preferred aspect the liquid is supplied to the nozzle with a pressure of 10-150 bar(g). In general, a highly viscous feed liquid requires a higher feed liquid pressure than a less viscous feed liquid.

The atomisation gas is supplied to the nozzle with a pressure of at least 0.2 bar(g). The pressure is generally not above 10 bar(g) due to process economics. In a preferred aspect the atomising gas is supplied with a pressure of 0.5-5 bar(g) and more preferred with 1-2 bar(g).

To obtain a sufficient swirl of the atomisation gas it is ejected from the nozzle at a rotational speed of 30 m/s or more. Suitably, the rotational speed does not exceed 500 m/s. In a preferred embodiment the atomising gas is ejected from the nozzle at a rotational speed in the range of 50 m/s to 400 m/s, typically 100-200 m/s.

The advantage of the present invention is that the combined pressuring of atomization gas and feed liquid is less energy consuming than predominate pressurizing of the atomization gas. According to the invention, the weight ratio of atomizing gas flow to feed liquid flow is in the range of 0.1 to 10, suitably the weight ratio of atomisation gas flow to feed liquid flow is from 0.5 to 5 and more suitable from 1-3.

The method of the present invention can produce droplets in various sizes and distributions. The invention shows most of its benefits when small droplets are produced. Therefore, in a preferred aspect the mean size of the droplets is less than 30 μm.

The present invention has the important feature of being able to produce particles of a small size combined with a high liquid flow capacity. In a certain embodiment of the invention, the liquid flow capacity of the external mixing two-fluid nozzle is 100 kg/h or above.

According to an aspect of the invention, two or more external mixing pressurized two-fluid nozzles are provided in the spray drying apparatus. As the feed liquid flow through the nozzle is controlled at an elevated liquid pressure it will be possible to distribute liquid between multiple nozzles in an easy manner.

The powder produced by the method of the invention may be of various materials. Usually, the spray dried powder is selected from the group consisting of powders for use in lithium ion batteries or other secondary batteries, polymer powders, starch or gelatine powders, coffee powder, powders from abrasive feeds, inorganic powders, hard metal powders, pharmaceutical powders and congealed powders.

The method of the present invention is found to be suited for viscous liquids as enabling the processing of a feed with a higher dry matter content compared to processes using conventional nozzles. The method, furthermore, holds the advantages of external mixing, thus, making the spray processing method particularly suitable for spray drying products from abrasive feeds.

The atomisation gas may be air, nitrogen, carbon dioxide, or any other suitable gas.

BRIEF DESCRIPTION OF THE DRAWINGS

FIG. 3 is a schematic view of a spray drying apparatus according to the present invention.

DETAILED DESCRIPTION OF THE INVENTION

Figure 1:
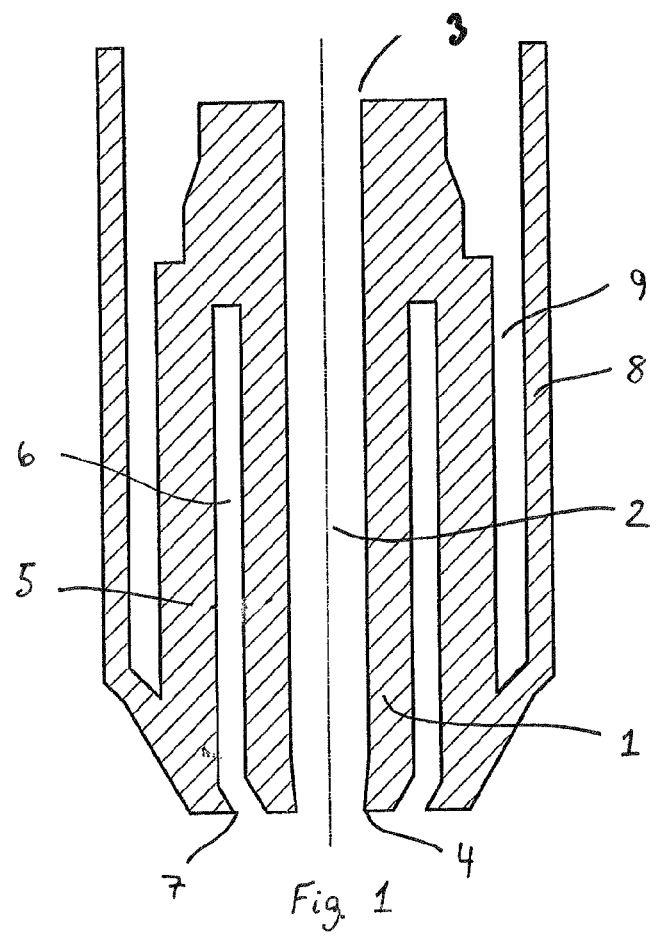
FIG. 1 is a cross-sectional view along the axis of the external mixing two-fluid nozzle in an embodiment of the present invention.
Figure 2:
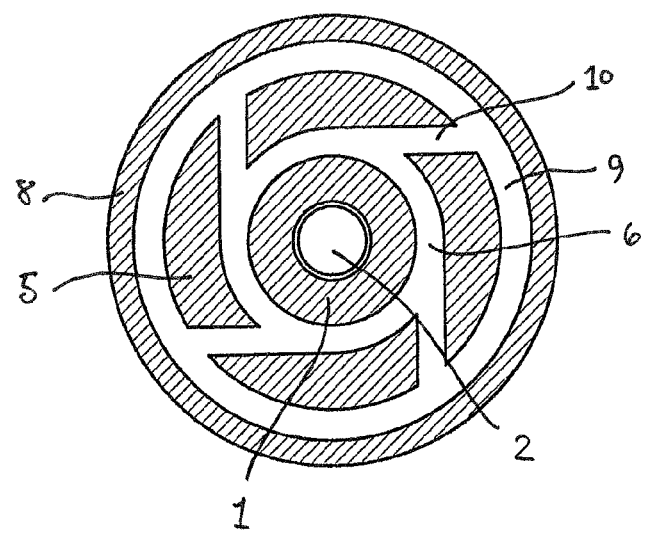
FIG. 2 is a radial cross-sectional view of the external mixing two-fluid nozzle in an embodiment of the invention, in an axial position where both gas conduits and connecting slots are present.

In the following an embodiment of the present invention will be described in details with reference to FIG. 1 and FIG. 2.

The external mixing two-fluid nozzle 17 is provided with an inner feed liquid pipe (1) extending axially between an upstream end and a downstream end of the nozzle. The inner feed liquid pipe (1) forms a channel, which provide for a feed liquid conduit (2). At the upstream end of the inner feed liquid pipe is a feed liquid inlet (3) through which the feed liquid can enter into the feed liquid conduit (2). At the downstream end of the inner feed liquid pipe (1) is a feed orifice (4) through which the liquid feed can exit the liquid feed conduit (2). Surrounding the inner feed liquid pipe (1) is a first gas pipe (5). The first gas pipe (5) extends co-axially with the inner feed liquid pipe (1) on the outside. The radius of the first gas pipe (5) is larger than the radius of the inner feed liquid pipe (1), and the first gas pipe (5) provides a pipe wall, which is spaced from the wall of the inner feed liquid pipe (1), thus providing a first gas conduit (6) between the inner feed liquid pipe (1) and the first gas pipe (5). The first gas pipe is provided with a gas outlet slit (7) at the downstream end of the nozzle. The first gas conduit does not extend all the way through the nozzle but is closed at the upstream end of the nozzle. Surrounding the first gas pipe (5) is a second gas pipe (8), which extends radially outside the first gas pipe (5). Thereby, the radius of the second gas pipe (8) is larger than the radius of the first gas pipe (5). The walls of the first and second gas pipes are spaced, thus providing a second gas conduit (9) between the pipe walls of the first and second gas pipe. The second gas conduit (9) is open at the upstream end of the nozzle but closed at the downstream end. The nozzle features one or more slots (10) provided in the first gas pipe (5). The one or more slots (10) go through the wall of the first gas pipe (5) thereby connecting the first and second gas conduits. The one or more slots (10) are adapted for providing a swirling motion of the gas flow.

During operation of the external mixing two-fluid nozzle a liquid feed stream typically enters the nozzle at the feed liquid inlet (3) and flows axially through the nozzle via the feed liquid conduit (2). Thus, the feed liquid flows downstream through the nozzle. The feed liquid stream exits the nozzle at the feed orifice (4). An atomisation gas initially flows parallel to the feed liquid stream and in the same downstream direction. The atomisation gas enters the nozzle at the upstream end into the second gas conduit (9) of the second gas pipe (8), which is open at the upstream end. From the second gas conduit (9) the atomisation gas flows into the first gas conduit (6) of the first gas pipe (5) through the the four slots (10). As the atomisation gas flows through the one or more slots (10) it obtains a swirling motion. Maintaining the swirling motion the atomisation gas flows through the first gas conduit (6) and exits through the gas outlet slit (7).

In the present description subsequent claims the term bar(g) refers to the pressure in bars above ambient or atmospheric pressure. When the present description and claims refers to spray processing or spray drying, a variety of different spray methods and processing methods is comprised in the term, including spray drying, spray congealing and spray granulation. It will be understood by a person skilled in the art that when spray congealing is performed, the drying gas is substituted with a cooling gas.

The powders for use in lithium-ion batteries produced by the present invention may be any of the various lithium ion salt used for rechargeable batteries. By way of examples only, the powders produced by the method of the present invention may be of the following materials: lithium cobalt oxide, lithium iron phosphate or another polyanion, $LiNiO_2$ or lithium manganese oxide or another spinel. Also other secondary battery powders than powders for use in lithium-ion batteries may be produced by this method. The powder material may also be a mixture of salts, such as $LiCo_{1/3}Ni_{1/3}Mn_{1/3}O_2$. The powders may optionally be doped with aluminium, niobium or zirconium.

A spray drying apparatus for implementing the present invention includes the above external mixing pressurized two-fluid nozzle 17 having an inlet 11 for receiving a feed liquid and an inlet 12 for receiving atomization gas, a drying chamber 13 for receiving the feed liquid and the atomization gas from the nozzle 17 and having a drying gas inlet 14 for receiving a drying gas, and an exits 15, 16 for discharging spent gas, comprising spent drying and spent atomizing gas and produced powder, respectively.

EXAMPLES

Example 1

Spray Drying of Lithium Ion Battery Powder

A lithium ion battery powder was spray dried in a GEA Niro SD 6.3 pilot spray dryer using a conventional two-fluid nozzle with external mixing and the GEA Niro COMBI-NOZZLE™ according to the present invention with the following results:

TABLE 1

| | | Conventional two-fluid nozzle | GEA Niro COMBI-NOZZLE ™ |
|---|---|---|---|
| Liquid feed rate | kg/h | 15 | 13 |
| Air consumption | kg/h | 30 | 22 |
| Air pressure | bar(g) | 3 | 2 |
| Feed pressure | bar(g) | 0.5 | 11 |
| Air to liquid ratio | kg/kg | 1.8 | 1.7 |
| Average particle size | μm | 14 | 7 |
| Span of particle size | n | 2.1 | 1.8 |

Example 2

Spray Drying of e-PVC Latex e-PVC latex is often spray dried to make fine powder particles and usually a large number of conventional two-fluid nozzles are required for this purpose as the maximum capacity of these nozzles are around 50-65 kg/h in order to make the required average particle size of around 20 micron. By application of the nozzle according to the invention it is possible to achieve a smaller average particle size with a significantly lower consumption of compressed air. Furthermore the liquid feed capacity of one COMBI-NOZZLE™ can be 200 kg/h, 500 kg/h, or higher.

TABLE 2

|  |  | Nozzle type | | | | | |
| --- | --- | --- | --- | --- | --- | --- | --- |
|  |  | Conventional two-fluid nozzle | | | GEA Niro COMBI-NOZZLE ™ | | |
| Air to feed ratio | kg/kg | 1 | 1.25 | 1.5 | 1 | 1.25 | 1.5 |
| Average particle size | μm | 38 | 33 | 28 | 33 | 23 | 17 |

Example 3

Atomization of High Viscosity Melts

A highly viscous melt of a polymer has been spray congealed using the COMBI-NOZZLE™ at the below conditions. By conventional atomization technique the melt could not be satisfactorily congealed due to formation of filaments caused by poor droplet formation.

TABLE 3

| Melt feed rate | kg/h | 95 |
| --- | --- | --- |
| Liquid pressure | bar(g) | 100 |
| Air to liquid ratio | kg/kg | 1.4 |
| Average particle size | μm | 21 |

Example 4

Control of Span of Droplet Size

The span of the droplet size distribution from the COMBI-NOZZLE™ has been examined by spraying of water and the span has been influenced by varying the theoretical spray angle of the liquid injection nozzle. The following results have been achieved using Malvern droplet size measurement apparatus:

TABLE 4

| Theoretical spray angle | degree | 50 | 65 | 80 |
| --- | --- | --- | --- | --- |
| Mean droplet size | μm | 18 | 15 | 13 |
| Span of droplet size | n | 0.95 | 1.1 | 1.2 |

The invention claimed is:

1. A spray processing method for producing a spray dried powder, the method comprising:
providing a spray drying apparatus comprising: an external mixing pressurized two-fluid nozzle comprising an inner feed liquid pipe extending axially between an upstream end and a downstream end, the inner feed liquid pipe comprising an inlet for receiving a feed liquid positioned at the upstream end and a feed orifice positioned at the downstream end, the external mixing pressurized two-fluid nozzle further comprising a first gas conduit and a second gas conduit, wherein said second gas conduit receives an atomization gas, a drying chamber for receiving the feed liquid and the atomization gas from the nozzle and having a drying gas inlet for receiving a drying gas, and a first exit for discharging spent gas, comprising spent drying gas and spent atomization gas, and a second exit for discharging produced powder;
spraying, in the drying chamber, the feed liquid through the external mixing two-fluid nozzle using liquid pressure and the atomization gas into droplets;
drying the droplets to powder;
discharging the powder through the second exit for the produced powder and the spent gas through the first exit for the spent gas,
wherein the feed liquid is supplied to the nozzle with a pressure at or above 8 bar(g),
wherein the atomization gas is supplied to the nozzle with a pressure in the range of 0.2 bar(g) to 10 bar(g),
wherein the entire amount of atomization gas in the nozzle is provided with a swirling motion,
wherein the weight ratio of atomization gas flow to feed liquid flow is in the range of 0.1 to 10,
wherein the swirling motion is provided by one or more slot(s) connecting the second gas conduit and the first gas conduit,
wherein said second gas conduit is connected to a gas supply for receiving the atomization gas and formed between a first gas pipe and a second gas pipe extending radially outside the first gas pipe,
wherein said first gas conduit is formed between the inner feed liquid pipe and the first gas pipe,
wherein said second gas conduit is closed at the downstream end,
wherein said first gas conduit is closed at the upstream end and is connected to a gas outlet slit in the downstream end, and
wherein, in the second gas conduit, the atomization gas flows parallel to, and in the same direction as, the feed liquid.

2. The spray processing method according to claim 1, wherein the one or more slot(s) connecting the first gas conduit and the second gas conduit extend tangentially to an outer surface of the inner feed liquid pipe.

3. The spray processing method according to claim 1, wherein the entire amount of gas for atomizing the liquid flows through the one or more slots, which are adapted for providing a swirling motion of the gas flow.

4. The spray processing method according to claim 1, wherein the feed liquid is supplied to the nozzle with a pressure of 10 bar(g) to 150 bar(g).

5. The spray processing method according to claim 1, wherein the atomization gas is supplied with a pressure of 0.5 bar(g) to 5 bar(g).

6. The spray processing method according to claim 1, wherein the atomization gas is ejected from the nozzle at a rotational speed of 50 m/s to 400 m/s.

7. The spray processing method according to claim 1, wherein the atomization gas is ejected from the nozzle at a rotational speed of 100 m/s to 200 m/s.

8. The spray processing method according to claim 1, wherein the weight ratio of atomization gas flow to feed liquid flow is from 0.5 to 5.

9. The spray processing method according to claim 1, wherein the mean size of the droplets is less than 30 μm.

10. The spray processing method according to claim 1, wherein the mean size of the powder particles is less than 25 μm.

11. The spray processing method according to claim 1, wherein the mean size of the powder particles is less than 10 μm.

12. The spray processing method according to claim 1, wherein a liquid flow capacity of the external mixing two-fluid nozzle is 100 kg/h or above.

13. The spray processing method according to claim 1, wherein two or more external mixing two-fluid nozzles are provided in the spray drying apparatus.

14. The spray processing method according to claim 1, wherein the spray dried powder is selected from the group consisting of: powder for lithium ion batteries, powder for batteries, polymer powders, starch or gelatine powders, coffee powder, powders from abrasive feeds, inorganic powders, hard metal powders, pharmaceutical powders and congealed powders.

15. The spray processing method according to claim 1, wherein the gas outlet slit and the feed orifice are in essentially a same horizontal position.

16. The spray processing method according to claim 1, wherein the inner feed liquid pipe and the first gas pipe converge radially towards a center at the downstream end.

17. The spray processing method according to claim 1, wherein, in the second gas conduit, the atomization gas flows co-axially with the liquid feed stream.

* * * * *